(No Model.)
W. A. McALPINE.
PLANTER.
No. 459,551. Patented Sept. 15, 1891.
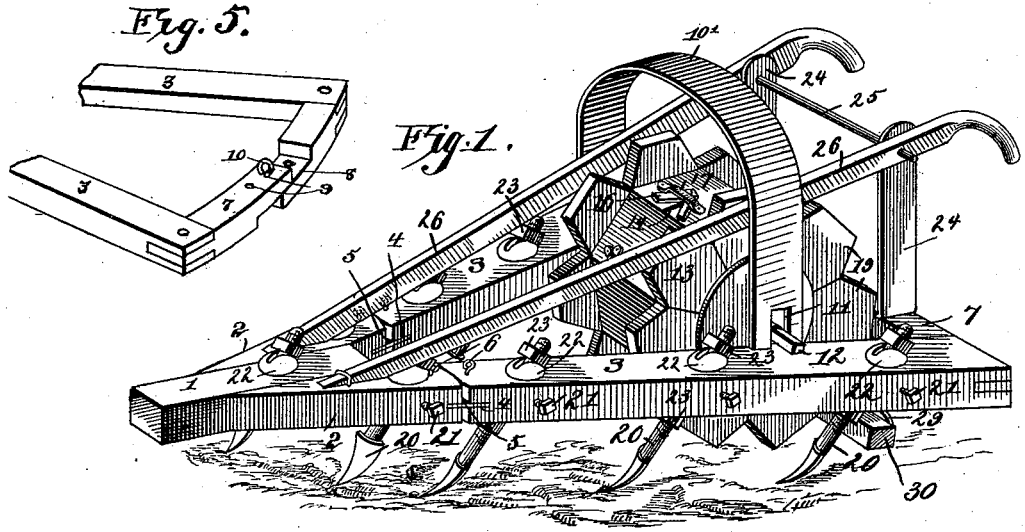
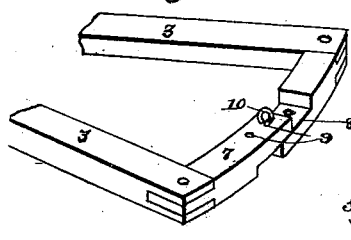
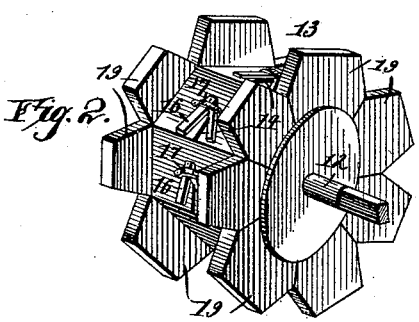
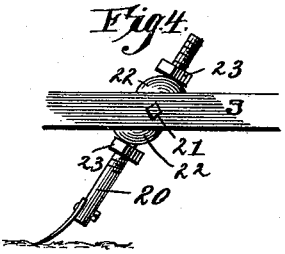
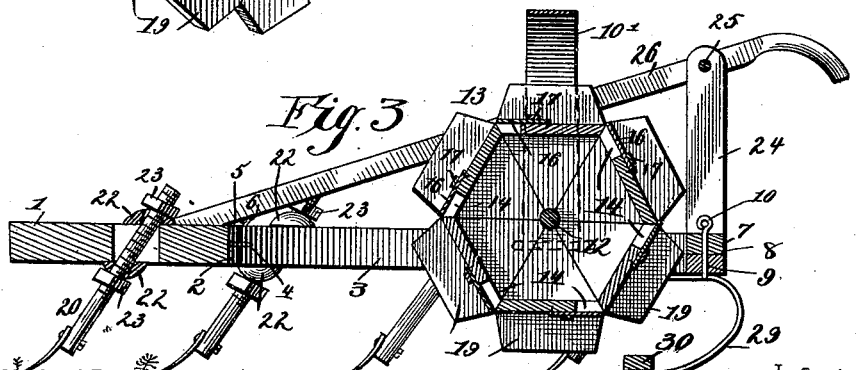
Witnesses:
H. S. Dieterich
W. S. Duvall
Inventor
Wiley A. McAlpine
By his Attorneys,
C. A. Snow & Co.

UNITED STATES PATENT OFFICE.

WILEY A. McALPINE, OF FOREST, MISSISSIPPI, ASSIGNOR OF ONE-HALF TO JOHN Q. BAGGETT, OF SAME PLACE.

PLANTER.

SPECIFICATION forming part of Letters Patent No. 459,551, dated September 15, 1891.

Application filed January 7, 1891. Serial No. 376,999. (No model.)

*To all whom it may concern:*

Be it known that I, WILEY A. MCALPINE, a citizen of the United States, residing at Forest, in the county of Scott and State of Mississippi, have invented a new and useful Planter, of which the following is a specification.

This invention relates to a combined harrow and planter, the objects being to provide a combination implement for harrowing the ground and simultaneously therewith planting the corn, said implement to be of cheap and simple construction and provided with proper adjusting means for setting the teeth of the harrow so as to regulate their depth of penetration and for regulating the flow of seed.

Other objects and advantages of the invention will hereinafter appear in the following description, and the novel features thereof will be particularly pointed out in the claims.

Referring to the drawings, Figure 1 is a perspective of a combined harrow and corn-planter constructed in accordance with my invention, the harrow-frame being shown expanded to the greatest extent. Fig. 2 is a detail of the hopper or drum. Fig. 3 is a vertical longitudinal section. Fig. 4 is a detail in elevation of one of the harrow or cultivator teeth and a portion of the frame-work. Fig. 5 is a perspective in detail of the rear end of the frame.

Like numerals of reference indicate like parts in all the figures of the drawings.

1 designates the draft-beam, to the opposite sides of which are securely bolted the front beveled ends of a pair of harrow or cultivator beams, which latter comprise a pair of rigid front sections 2 and rear movable sections 3, said sections having their adjacent ends slotted or kerfed, as at 4, and connected by means of a hinged plate 5, through which, near its opposite ends, are passed pivot-bolts 6, so that the rear sections may be swung toward and away from each other, such movement being possible by reason of the rounded ends of the front sections 2. The rear end of each rear section 3 has let therein a transverse curved adjusting-bar 7, said bars being cut away upon their adjacent sides, as at 8, so as to overlap each other, and provided with perforations 9 for the reception of suitable adjusting-pins 10, by which the harrow or cultivator-frame may be made wider or narrower, as desired.

10' designates an inverted-U-shaped removable bail, of flexible metal, secured to the inner sides of the harrow or cultivator bars or beams and provided immediately above the same with openings 11, in which is mounted a transverse shaft 12. The openings 11 are rectangular, as are also the ends of the shaft, and upon the latter, between the terminals of the U-shaped bail, is mounted for rotation a revoluble seed hopper or drum 13. This drum or hopper has a polygonal periphery provided at each of its sides with seed-slot 14, each covered by a pair of pivoted seed-plates 16, held in position by means of a strap or keeper 17. By spreading or closing the plates 16 the seed-slots may be increased or decreased in size, so that a greater or less quantity of seed may pass at one time through the slots. The heads or ends of the hopper project beyond the periphery and are notched to form intermediate traction-teeth 19. At intervals the harrow or cultivator beams are provided with openings, and in each opening is mounted the cylindrical shank of a cultivator or harrow tooth 20, which latter terminates at its lower end in a shovel or shear, and has its upper end threaded. Set-screws 21 are inserted transversely through the beam or bar opposite the shank of each tooth, and are adapted to impinge upon the same. Washers 22, having elongated slots, are mounted upon the shank above and below the beam, and outside of the washers are mounted nuts 23, whereby the tooth may be set at any inclination and securely clamped in position. Standards 24 rise from the adjusting-bars 7 and are connected by a transverse bar 25, passing loosely through perforations in the upper ends of the standards, and beyond said standards the bar is rigidly connected to a pair of handles 26, the front ends of which are secured to the harrow or cultivator-beams. Upon the under side of the beams 3 are secured rearwardly and downwardly disposed spring-arms 29, and in the same are secured the ends of a transverse drag-bar 30.

The operation of my invention will be readily understood from the foregoing description when considered in connection with the accompanying drawings, but may be briefly stated, as follows: The frame is first adjusted for the width of hill desired, and as the implement moves the agitation given to the hopper by the toothed drum causes an intermittent dropping of the seed or kernel, which is followed by the drag-bar that acts to cover the same. If desired, the bail can be removed and the hopper also, the front tooth removed, and the beam adjusted, so as to constitute an ordinary cultivator for cultivating between rows. The cultivator can be adjusted to remove the front plow and straddle the crop, passing over one time to each row to save hoe-work while the crop is young.

Having described my invention, what I claim is—

1. The combination, with the frame-work, of the revoluble polygonal-shaped seed-drum, the faces of which are provided with seed-openings and the opposite heads of which are provided opposite the faces with teeth projecting beyond said faces, substantially as specified.

2. The combination, with the draft-beam, and the opposite side beams rigidly bolted thereto and diverging toward their rear ends, said beams being formed in sections hinged at their adjacent ends, of the curved overlapping bars secured to the rear ends of the beams and provided with perforations, the adjusting-bolts, the standards rising from the bars, the rod mounted loosely in perforations in the standards and extending beyond the same, and the opposite handles connected to the front sections of the side beams and to the ends of the rod, substantially as specified.

3. In a machine of the class described, the combination, with the beam, of the cultivator or harrow teeth having cylindrical shanks mounted in an opening in the beam and loosely fitting the same, binding-screws inserted through the beam and bearing on the shank, slotted washers having curved exteriors mounted on the shank above and below the beam, and clamping-nuts threaded on the shank above and below the washers, substantially as specified.

4. The combination, with the opposite diverging harrow-bars adjustable at their rear ends and loosely connected at their front ends, of the inverted-U-shaped bail mounted in keepers and removable and provided with rectangular openings, an axle or shaft mounted in the openings and having its ends squared to approximate the same, and a revoluble hopper mounted loosely on the axle provided with a polygonal periphery having seed openings and slides and with opposite heads projecting beyond the periphery and provided with teeth, substantially as specified.

In testimony that I claim the foregoing as my own I have hereto affixed my signature in presence of two witnesses.

WILEY A. McALPINE.

Witnesses:
W. A. SIMMONS,
J. Q. BAGGETT.